United States Patent [19]

Rice

[11] Patent Number: 4,767,236

[45] Date of Patent: Aug. 30, 1988

[54] SEWER RENOVATION BY EXPANDING A LINER WITHIN THE SEWER AND PLACING A NEW PIPE WITHIN THE EXPANDED LINER

[76] Inventor: Nigel Rice, Epworth Grange, Beltoft, Epworth, Near Doncaster, DN9 1JD, England

[21] Appl. No.: 65,275

[22] Filed: Jun. 22, 1987

[30] Foreign Application Priority Data

Jun. 23, 1986 [GB] United Kingdom ............... 8615280

[51] Int. Cl.⁴ ............................................. F16L 1/00
[52] U.S. Cl. ..................................... 405/154; 29/255;
29/402.09; 29/523; 138/97; 156/71; 156/196;
156/294; 175/53; 175/230; 405/156
[58] Field of Search ............... 156/71, 196, 294;
405/154, 174, 156, 184; 138/97; 175/53, 230;
166/55.8; 29/402.09, 402.01, 255, 523;
254/134.3 FT

[56] References Cited

U.S. PATENT DOCUMENTS

| | | | |
|---|---|---|---|
| 3,474,832 | 10/1969 | Broadhead et al. | 138/97 |
| 3,700,265 | 10/1972 | Dufour et al. | 138/97 |
| 4,069,573 | 1/1978 | Rogers et al. | 29/402.09 |
| 4,109,684 | 8/1978 | Fernandez | 138/97 |
| 4,207,130 | 6/1980 | Barber | 138/97 |
| 4,334,345 | 6/1982 | Jenks | 29/523 |
| 4,432,824 | 2/1984 | Cook et al. | 156/294 |
| 4,456,401 | 6/1984 | Williams | 156/294 |
| 4,507,019 | 3/1985 | Thompson | 405/184 |
| 4,581,801 | 4/1986 | Kobuck et al. | 29/523 |
| 4,637,756 | 1/1987 | Boles | 405/154 |
| 4,647,072 | 3/1987 | Westman | 138/97 |
| 4,648,626 | 3/1987 | Uinciguerra et al. | 29/523 |
| 4,648,746 | 3/1987 | Abinett | 405/154 |
| 4,678,370 | 7/1987 | Allen | 405/154 |

*Primary Examiner*—Jerome Massie
*Attorney, Agent, or Firm*—Mason, Kolehmainen, Rathburn & Wyss

[57] ABSTRACT

An existing underground sewer or other pipe is renovated by rupturing and radially expanding the pipe and installing a replacement pipeline within the ruptured pipe. The pipe is ruptured and radially expanded by introducing a plurality of radially expandable tubular members into the pipe so as to form a liner. Each member is then radially expanded so that the liner engages with and then ruptures the portion of the pipe adjacent thereto. The tubular members may be radially expanded by inflating a bag within the confines of the members.

10 Claims, 3 Drawing Sheets

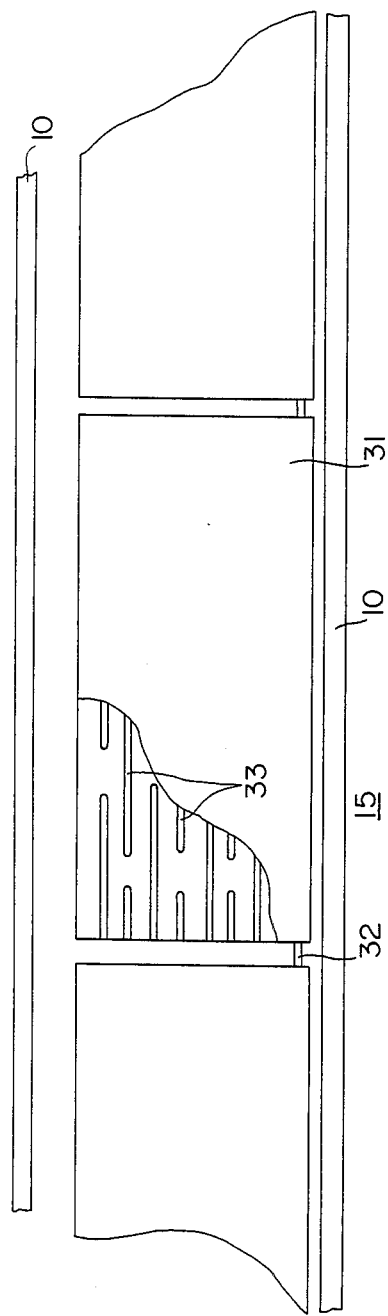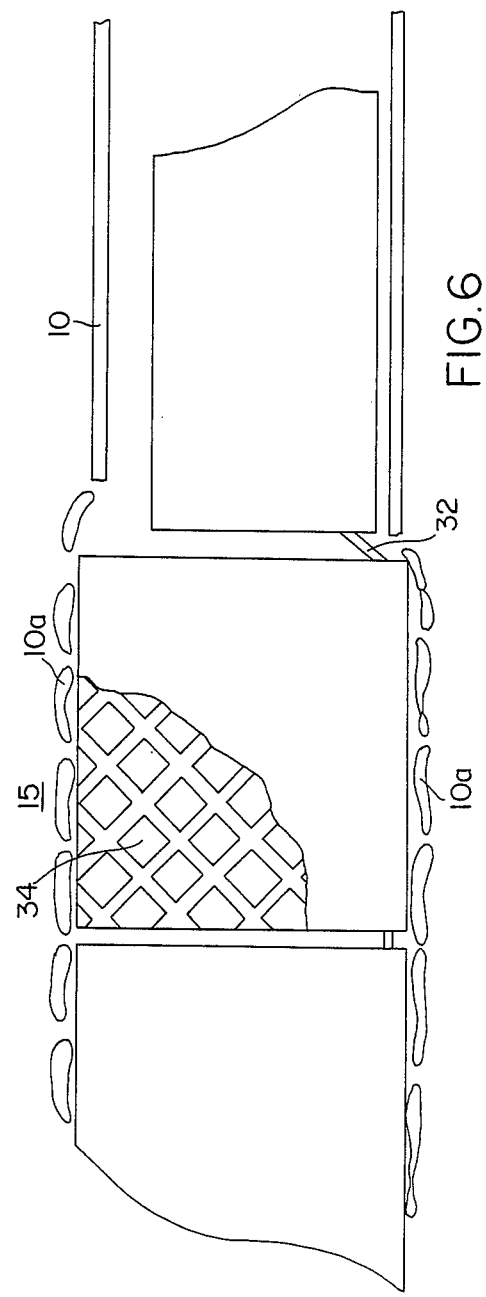

SEWER RENOVATION BY EXPANDING A LINER WITHIN THE SEWER AND PLACING A NEW PIPE WITHIN THE EXPANDED LINER

This invention relates to a method of renovating an existing sewer or other underground pipe.

There are many known techniques for renovating existing sewers (and other underground pipes), and one of these involves the use of a percussive impact mole, which is moved along the wall of the sewer and which simultaneously ruptures and then radially expands this wall. The mole is followed by a replacement pipeline of a similar, or in some cases increased, diameter as compared with the diameter of the unruptured wall of the sewer.

This known method suffers from the disadvantage of requiring entry and exit pits to be constructed for the retrieval of the mole. Also, in certain ground conditions, the hole formed by the shield of the mole is liable to regress (i.e. the wall debris tends to fall into the hole and reduce the diameter). This can create substantial resistance to entry of the replacement pipeline and also substantial frictional resistance to the insertion movement of the replacement pipeline. This therefore limits the selection of the pipeline material to one capable of withstanding the jacking and towing forces necessary for its installation.

The present invention therefore seeks to provide a method which improves the manner by which the replacement pipe can be installed within the existing sewer or other underground pipe.

According to the present invention there is provided a method of renovating a length of an existing underground pipe by rupturing and radially expanding the wall of the pipe along the length of the pipe, and installing a replacement pipeline within the ruptured wall, characterised in that a plurality of radially expandable tubular members is introduced into the pipe so as to form a liner and each member is radially expanded so that it engages with and then ruptures the portion of the wall of the pipe adjacent thereto prior to introduction of the replacement pipeline.

Thus, in use, the liner formed by the tubular members provides sufficient stiffness to resist ground loading, until such time as the replacement water-tight pipeline can be installed. The members therefore perform a triple function, in that (1) they are able to be expanded so as to rupture the wall of the existing sewer, (2) they form a liner which holds back the wall debris and the surrounding soil structure until the replacement pipeline is installed and (3) they provide a smooth guide for the movement of the replacement pipeline internally and longitudinally of the liner.

Further, the use of the tubular members to form the liner enables the existing pipe wall to be ruptured, and then lined, without the necessity for excavation to take place, since the tubular members can be axially sufficiently short to enable them to be entered into the pipe system via a manhole.

The replacement pipeline which is installed within the existing pipe, by being guided along the inner smooth surface of the liner formed by the tubular members may comprise a helically wound plastics strip, e.g. as sold under the Trade Mark Ribloc, a clayware or other suitable pipe material.

The tubular members may be introduced into the length of the pipe by any convenient means, e.g. they may be pushed in or pulled through as a chain of interconnected members.

In one embodiment of the invention the tubular members are in the form of split metal rings which are constructed so that they can be radially expanded from an initial configuration to an expanded configuration of predetermined size and be locked in that expanded configuration. This capability of locking at the predetermined size may be achieved by any convenient means, such as by providing an axial slot in the wall of the ring, such that a free edge of the ring can be engaged in the slot. In the initial relaxed configuration of the ring the free edge will lie radially inwardly of the other edge, so that the ring effectively forms a short spiral in section. Radial expansion of the ring increases the diametral extent of the ring, and this continues until such time as the free end of the ring can enter the slot when the ring has reached its predetermined size so that the ring is locked in its expanded configuration.

In another embodiment of the invention the tubular members are formed by expanded metal i.e. they are in the form of tubular metallic sleeves provided with a plurality of slots. Radial expansion can take place by deformation of the slot-defining portions of the sleeve so as to change the size and shape of the slots. In this case, the collapse resistance of the expanded configuration is sufficient to hold back the wall debris and surrounding soil.

The tubular members may be radially expanded by means of an expander. This may be moved incrementally from member to member to expand each member in turn. The expander may be moved within the members by any convenient means. Preferably, however, it is pushed along the length of the pipe to be renovated e.g. along a sewer run extending between adjacent manholes.

The expander is designed so as to be capable of carrying out the necessary radial expansion of each member and is sufficiently powerful to enable each member to be expanded radially to engage with and rupture the wall of the existing pipe. By suitable design of the members, in relation to the diameter of the existing pipe, they can be expanded radially to such an extent that they can completely rupture the existing wall of the pipe, and force the wall debris and the surrounding soil radially outwardly, thereby defining a larger cylindrical passage, for subsequent re-lining, than the original passage defined by the existing pipe wall. Accordingly this enables an existing pipe to be re-lined with a replacement pipeline having a larger diameter than the existing pipe.

The expander may take any suitable form, to enable sufficiently powerful radial expansion of each member, and conveniently it takes the form of an inflatable bag which, preferably, is inflated by hydraulic pressure, to enable the necessary high pressures to be achieved. However, other inflating means may be adopted, e.g. pneumatic pressure, if desired.

Any annular gap which may remain between the outer surface of the liner formed by the tubular member and the surrounding wall debris and soil may be left or be filled with a grout in order to stabilise the surrounding soil and/or fill any voids. Grout may also be introduced, if required, between the outer wall surface of the replacement pipeline, and the inner surface of the liner formed by the tubular members.

For a better understanding of the invention and to show how the same may be carried out reference will now be made, by way of example, to the accompanying drawings, in which:

FIG. 1 is a schematic sectional illustration of an existing sewer at one stage in its renovation by a method according to the present invention;

FIG. 2 corresponds to a part of FIG. 1 and schematically illustrates the sewer at a later stage in its renovation, FIG. 3 is a perspective view of one form of expandable tubular member used in the method;

FIG. 5 is a side view of another form of tubular member used in the method; and

FIG. 6 is a side view of the tubular member of FIG. 5 when in its expanded configuration.

Figure 1:
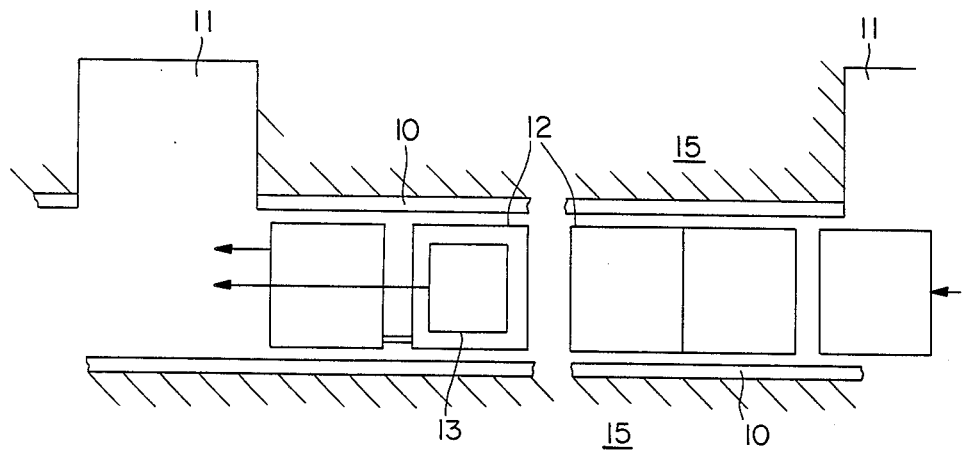

Referring now to FIG. 1 drawing, there is shown a length of an existing sewer (or other underground pipe) having a wall 10 and which extends between a pair of manholes 11. As will be described in more detail below, the method of the invention involves the rupturing and radial expansion of the wall 10 along its length, and the installation of a replacement pipeline 14 (see FIG. 2) within the ruptured wall.

Thus, a plurality of tubular members 12 is introduced into the length of sewer, and are initially located within the confines of the wall 10 so as to form a liner for the sewer. The tubular members 12 can be introduced into the sewer length by being pushed through the sewer (as illustrated in the right hand portion of FIG. 1) or by being towed through the sewer as a chain of interconnected members (as illustrated in the left hand portion of FIG. 1). The axial length of each tubular member 12 is such that it can be readily inserted into the sewer via one of the existing manholes 11, and hence it is not necessary for any excavation to take place.

Each tubular member 12 is arranged to be radially expandable to an expanded configuration of predetermined size and is introduced into the lengtt of sewer while occupying its initial size which is smaller than this predetermined size.

After the desired number of tubular members have been introduced into the sewer, an expander device in the form of a hydraulically inflatable bag 13 is moved incrementally from member to member along the length of the liner, the bag being inflated to expand each member radially in turn so that the members engage with and then rupture the portions of the wall 10 adjacent thereto and remain in their expanded configuration. After each tubular member has been radially expanded, the bag is deflated, and advanced to the next tubular member to be expanded. Thereafter, the replacement pipeline 14 can be moved along the length of the expanded liner formed by the members 12, conveniently by being towed therealong.

Figure 2:
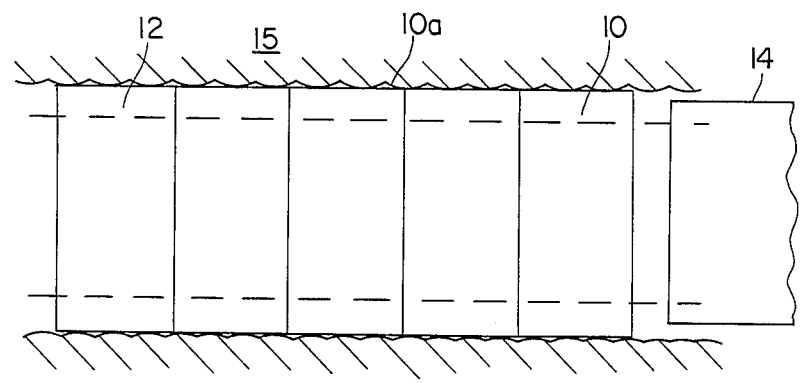

As can be seen particularly from FIG. 2, each tubular member 12 is radially expanded from its initial relaxed configuration to an expanded configuration having a larger diameter. In so doing, it causes the existing wall 10 of the sewer to be ruptured and displaced radially outwardly to take up the position shown by reference 10a in FIG. 2. The wall debris will be moved radially outwardly into the surrounding soil structure 15, and it will therefore be noted that pipeline 14 can be of larger diameter than the inner diameter of the wall 10 of the existing sewer so that not only is the existing sewer renovated, but it is also capable of carrying a greater rate of flow of drainage material.

Thus, in use of the tubular members 12, they form a liner which provides sufficient stiffness to resist ground loading until such time as the water-tight pipeline 14 can be installed. The members 12 therefore perform a triple function, in that they are able to be expanded so as to rupture the wall of the existing sewer; they form a liner which holds back the wall debris and the surrounding soil structure 15 until the replacement pipeline is installed, ahd they provide a smooth guide (because they have a smooth internal surface) for the movemeht of the replacement pipeline internally and longitudinally of the liner.

The replacement pipeline 14 may be a helically wound plastics strip e.g. of the type sold under the Trade Name Ribloc, clayware or any other suitable pipeline material. Any annular gap remaining between the liner formed by the tubular members 12 and the surrounding wall debris and the soil 15 may be left or may be filled with a grout in order to stabilise the surrounding soil and/or fill any voids. Grout may also be introduced, if desired, into the annular space defined between the outer surface of the replacement pipeline 14 and the inner wall surface of the liner formed by the tubular members 12.

Figure 3:
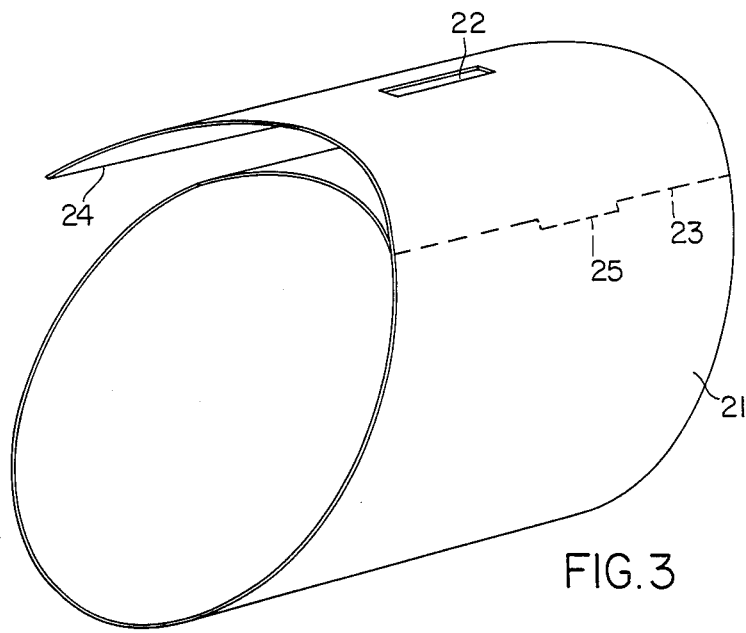
Figure 4:
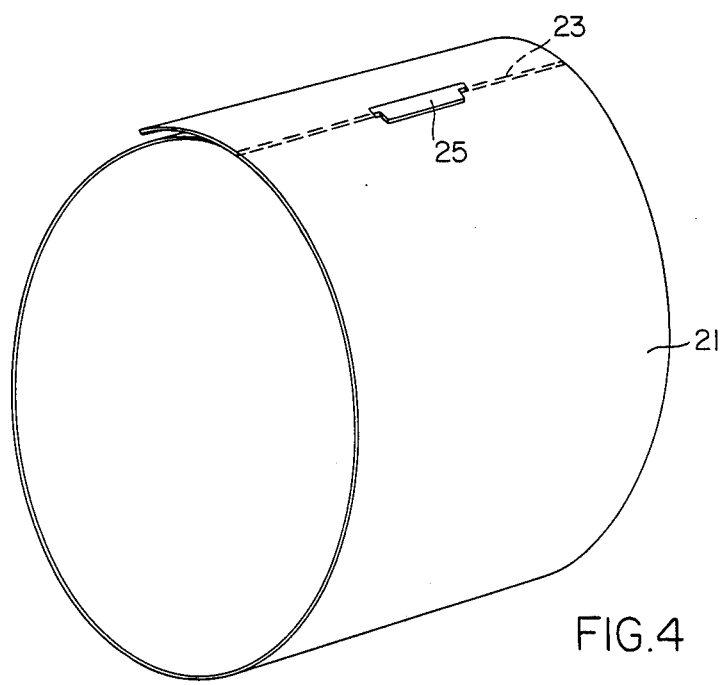
FIG. 4 is a perspective view of the tubular member of FIG. 3 when in its expanded configuration.

Referring now to FIGS. 3 and 4 there is shown one embodiment of a tubular member which may be used in accordance with the invention. The tubular member is in the form of a split ring 21 formed of steel and including a portion defining a slot 22. In its relaxed configuration as shown in FIG. 3, the ring defines a short spiral in that edge 23 of the ring lies within and abuts against a part of the inner surface of the ring located between edge 23 and the opposite edge 24. The edge 23 is provided with a protrusion 25. As the ring is radially expanded outwardly by the expander (not shown in FIGS. 3 and 4) the edge 23 traverses across the inner surface of the ring until the protrusion 25 meets and enters the slot 22. The interengagement of the protrusion 25 and slot 22 locks the ring in its expanded configuration.

Referring to FIGS. 5 and 6, there is shown another embodiment of the tubular member. In this embodiment, there is shown a plurality of tubular members 31 interconnected together by linkages 32. Each tubular member 31 is in the form of a cylindrical sleeve formed of expanded steel. More particularly, the sleeve includes portions defining axially extending slots 33. As the sleeve is radially expanded outwardly by the expander (not shown in FIGS. 5 and 6) the slot-defining portions can deform thereby converting the slots 33 into parallelogram-shaped voids 34 and reducing the axial length of the sleeve. The expanded configuration of the sleeve is sufficiently dimensionally stable to hold back the wall debris and surrounding soil.

I claim:

1. A method of renovating a length of an existing underground pipe which comprises introducing a plurality of radially expandable tubular members into the pipe so as to form a liner, radially expanding each member so that the liner engages with and then ruptures the pipe, and introducing a replacement pipeline into the liner.

2. A method according to claim 1 wherein each tubular member is in the form of a split ring which is radially expandable between an initial configuration and an expanded configuration and which includes a means for locking the ring in its expanded configuration.

3. A method according to claim 2 wherein each ring has a portion defining a slot and the locking means comprises the slot and a protrusion at one edge of the split ring, the protrusion being engageable with the slot when the ring is in its expanded configuration.

4. A method according to claim 1 wherein each tubular member is in the form of a cylindrical sleeve formed of metal including a plurality of deformable slot defining portions.

5. A method according to claim 1 wherein the tubular members are radially expanded by means of an inflatable bag located within the confines of the tubular members.

6. A method according to claim 5 wherein the bag is incrementally moved from one of the tubular members to the tubular member adjacent thereto so that the tubular members are radially expanded in turn.

7. A method according to claim 5 wherein the bag is inflated hydraulically.

8. A method according to claim 5 wherein the bag is inflated pneumatically.

9. A method according to claim 1 wherein the tubular members are pushed along the pipe from one end.

10. A method according to claim 1 wherein the tubular members are connected together by linkages and are pulled along the pipe.

* * * * *